US011092198B2

(12) United States Patent
Alexa et al.

(10) Patent No.: US 11,092,198 B2
(45) Date of Patent: Aug. 17, 2021

(54) APPARATUS, IN PARTICULAR INSERTION AID, FOR PLAIN BEARING SHELL MOUNTING

(71) Applicant: MAN Truck & Bus AG, Munich (DE)

(72) Inventors: Heinrich Alexa, Wendelstein (DE); Jan Croner, Veitsbronn (DE); Giovanni Astorino, Nuremberg (DE); Georg Wendler, Henfenfeld (DE)

(73) Assignee: MAN Truck & Bus AG, Munich (DE)

( * ) Notice: Subject to any disclaimer, the term of this patent is extended or adjusted under 35 U.S.C. 154(b) by 29 days.

(21) Appl. No.: 16/213,717

(22) Filed: Dec. 7, 2018

(65) Prior Publication Data

US 2019/0178296 A1 Jun. 13, 2019

(30) Foreign Application Priority Data

Dec. 8, 2017 (DE) .................... 10 2017 129 233.0

(51) Int. Cl.
| | |
|---|---|
| *F16C 43/02* | (2006.01) |
| *F16C 35/02* | (2006.01) |
| *F16C 33/04* | (2006.01) |
| *F16C 17/02* | (2006.01) |
| *B25B 27/14* | (2006.01) |
| *F16C 33/08* | (2006.01) |
| *F16C 9/02* | (2006.01) |
| *B25B 27/06* | (2006.01) |

(Continued)

(52) U.S. Cl.
CPC ............ *F16C 43/02* (2013.01); *B23P 15/003* (2013.01); *B25B 27/06* (2013.01); *B25B 27/14* (2013.01); *F16C 9/02* (2013.01); *F16C 17/022* (2013.01); *F16C 33/046* (2013.01); *F16C 33/08* (2013.01); *F16C 35/02* (2013.01); *F16C 9/04* (2013.01); *F16C 2226/10* (2013.01)

(58) Field of Classification Search
CPC combination set(s) only.
See application file for complete search history.

(56) References Cited

U.S. PATENT DOCUMENTS

2002/0148325 A1* 10/2002 Bergsma ................. C22F 1/043
74/593

FOREIGN PATENT DOCUMENTS

| DE | 4415099 C1 | 9/1995 |
|---|---|---|
| DE | 19609925 A1 | 9/1997 |
| EP | 3228891 A1 | 10/2017 |

(Continued)

OTHER PUBLICATIONS

English translation of JP2013215848 (Year: 2013).*

(Continued)

*Primary Examiner* — Jun S Yoo
(74) *Attorney, Agent, or Firm* — Maginot, Moore & Beck LLP

(57) ABSTRACT

An apparatus mounts a plain bearing shell of a plain bearing in a bearing seat of a component. The apparatus has an attachment region for releasably attaching the apparatus to the component. The apparatus has a supporting region for supporting the plain bearing shell during an insertion of the plain bearing shell into the bearing seat of the component. During the insertion into the bearing seat, the plain bearing shell can slide along on the supporting region, with the result that the plain bearing shell does not come into contact with an outer edge of the bearing seat.

4 Claims, 4 Drawing Sheets

Figure 1:
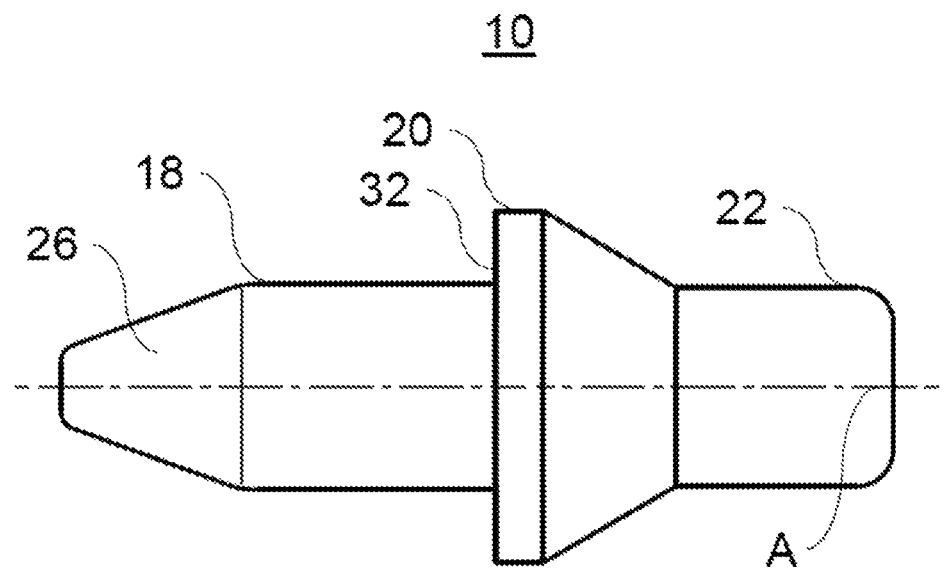

(51) Int. Cl.
*B23P 15/00* (2006.01)
*F16C 9/04* (2006.01)

(56) References Cited

FOREIGN PATENT DOCUMENTS

| JP | H0768427 A | 3/1995 |
| JP | 2010125572 A | 6/2010 |
| JP | 2013215848 A | 10/2013 |

OTHER PUBLICATIONS

German Search report for related application No. DE 102017129233. 0, dated Aug. 21, 2018.
Office Action from the EPO in a related case No. EP 18 205 574.9, dated Jun. 22, 2020.
European Search Report for related application No. DE102017129233, dated Apr. 2, 2019.

* cited by examiner

APPARATUS, IN PARTICULAR INSERTION AID, FOR PLAIN BEARING SHELL MOUNTING

The invention relates to an apparatus, in particular an insertion aid, for mounting a plain bearing shell in a bearing seat of a component.

Two-piece plain bearings are split before mounting into two plain bearing shells which are configured as half shells. A first plain bearing shell is inserted into a bearing seat of a component, for example a connecting rod or a bearing block. The second plain bearing shell is inserted into a bearing seat of a component cover, for example a connecting rod cover or a bearing block cover. A shaft to be mounted is inserted into the plain bearing shell in the bearing seat of the component. Finally, the component cover is placed onto the component and is fastened to it, for example, by means of screws.

Plain bearing shells typically have what is known as a spread. In this way, the diameter of the plain bearing shells is a little greater than that of the bearing seats, and said plain bearing shells are deformed a little elastically during the insertion into the bearing seats. During the insertion, the plain bearing shell comes into contact with a (metallic) edge of the bearing seat. Here, material can be scraped off on the back of the plain bearing shell. The material which is scraped off can pass into the plain bearing or can jam between the bearing shell and the bearing seat. Both of these can lead to the failure of the bearing and subsequent damage, for example as far as an engine failure.

The invention is based on the object of improving the mounting operation in the case of plain bearing shells. In particular, an abrasion of material on a bearing back of the plain bearing during the insertion of the plain bearing into a bearing seat is to be prevented or at least reduced.

The object is achieved by way of an apparatus and the use of the apparatus according to the independent claims. Advantageous developments are specified in the dependent claims and the description.

The apparatus is configured, in particular, as an insertion aid for plain bearings. The apparatus serves to mount a plain bearing shell of a plain bearing in a bearing seat of a component for a motor vehicle, preferably a commercial vehicle. The component can be, in particular, a bearing block part (for example, a lower part or cover) or a connecting rod part (for example, a connecting rod or connecting rod cover). The apparatus has a first attachment region for releasably attaching the apparatus to the component. The apparatus has a supporting region for supporting the plain bearing shell during an insertion of the plain bearing shell into the bearing seat of the component.

In particular, in the mounted state of the apparatus, the supporting region projects beyond an outer edge of the bearing seat of the component. During the insertion into the bearing seat, the plain bearing shell can slide along on the supporting region, with the result that the plain bearing shell does not come into contact with an edge of the bearing seat. This can prevent material being scraped off on a bearing back of the plain bearing shell. The apparatus can be attached releasably to the component in a simple way.

Even if reference is made here in part to a "first" attachment region and a "first" supporting region, the "first" attachment region can be the only attachment region of the apparatus and the "first" supporting region can be the only supporting region of the apparatus.

In one preferred exemplary embodiment, the first attachment region and/or the first supporting region are/is manufactured from a plastic material and/or an elastomer material. In this way, a suitable material pairing can be provided between the apparatus and the plain bearing shell, which material pairing can prevent an abrasion of material on a bearing back of the plain bearing shell. Furthermore, the material pairing can reduce a mounting force for inserting the plain bearing shell into the bearing seat, since the plain bearing shell can slide along on the first supporting region with a low resistance. In addition, possible damage of the component can be prevented by way of the apparatus. This can be important, for example, in the case of "cracked" or fracture-split connecting rods, since the fracture surfaces should not be changed here.

In a further preferred exemplary embodiment, the first attachment region and the first supporting region are manufactured integrally from one piece. In this way, the apparatus can be manufactured in a simple way.

The first attachment region and the first supporting region preferably together form a mushroom shape.

In one exemplary embodiment, the first attachment region is configured as a (for example, cylindrical) pin for plugging into a hole (for example, a screw hole) of the component. As an alternative, the first attachment region can be configured as a (for example, cylindrical) seat, in particular a screw shank seat, for plugging onto a screw shank of a screw, which screw shank is fastened to the component. In this way, the first attachment region can be adapted for different possible applications. In particular, elements which are already present (for example, screws or screw holes) on the component or component cover can be used for connecting to the first attachment region of the apparatus. As a consequence, no separate elements have to be provided on the component and the component cover for attaching the apparatus.

In a further exemplary embodiment, the first attachment region has a tapering section, in which the first attachment region tapers. The tapering section can facilitate the attachment of the apparatus to the component. A first attachment region which is configured as a pin can be plugged relatively simply into a hole of the component by means of the tapering region. A first attachment region which is configured as a seat can be plugged relatively simply onto a screw shank by means of the tapering region.

In one embodiment, the first supporting region is configured so as to adjoin the first attachment region, and/or the first supporting region extends radially to the outside starting from a centre axis, in particular a longitudinal axis, of the apparatus.

In a further embodiment, the first supporting region is of rotationally symmetrical configuration about a centre axis of the first supporting region. In this way, the apparatus can be used independently of an orientation of the apparatus about a rotary angle about the centre axis.

Rotational symmetry is present if a rotation by any desired angle about an axis replicates the object on itself.

In a further embodiment, the first supporting region is configured as a plain bearing region which makes sliding contact with the plain bearing shell on a bearing back of the plain bearing shell during the insertion in order to reduce an abrasion of material.

In one design variant, furthermore, the apparatus has a contact face which is, in particular, annular and/or planar, for placing the apparatus onto the component.

In a further design variant, the first supporting region has the contact face and/or the contact face adjoins the first attachment region.

In one exemplary embodiment, furthermore, the apparatus has a grip region for (manual) gripping and guiding of the apparatus. In particular, the grip region can be arranged so as to adjoin the first supporting region and/or so as to lie opposite the first attachment region.

In a further exemplary embodiment, furthermore, the apparatus has a second attachment region for attaching the apparatus to a further component with a bearing seat. In particular, the second attachment region can differ from the first attachment region. As an alternative or in addition, the apparatus has a second supporting region for supporting the plain bearing shell during an insertion of the plain bearing shell into the bearing seat of the further component. In particular, the second supporting region can differ from the first supporting region. In this way, a plurality of applications can be combined in the apparatus. For example, the apparatus can be used by way of the first attachment region on a main bearing block of a crankshaft and by way of the second attachment region on a connecting rod.

In one development, the second attachment region is arranged at an end of the apparatus, which end lies opposite the first attachment region. As an alternative or in addition, the second supporting region and the first supporting region are arranged between the first attachment region and the second attachment region.

It is also possible that a diameter (for example, an internal diameter or an external diameter) of the first attachment region which is configured as a (for example, cylindrical) pin or as a (for example, cylindrical) seat differs from a diameter of the second attachment region which is configured as a (for example, cylindrical) pin or as a (for example, cylindrical) seat. As an alternative or in addition, the first supporting region and the second supporting region can project to a different extent.

In one embodiment, the apparatus has a plurality of first attachment regions which are, in particular, of identical configuration. As an alternative or in addition, the apparatus has a plurality of first supporting regions which are, in particular, of identical configuration, for supporting a plurality of plain bearing shells during an insertion of the plurality of plain bearing shells into a plurality of bearing seats of a plurality of components. In this way, for example in the case of serial assembly, a plurality of bearing shells can be inserted at the same time or one after another into bearing seats which lie next to one another, it being necessary for the apparatus to be attached only once at the beginning.

In one development, the apparatus has an elongate body, in particular a bar or a rod. The plurality of first attachment regions and/or the plurality of first supporting regions are connected to the elongate body, in particular fastened to the elongate body, such that they are spaced apart from one another.

The invention also relates to a use of an apparatus as disclosed herein during the insertion of a plain bearing shell into a bearing seat of a component.

The use preferably comprises attaching of the apparatus to the component by means of the first attachment region, with the result that the first supporting region projects beyond an outer edge of the bearing seat. The use comprises inserting of a first plain bearing shell, in particular a first plain bearing half shell, into the bearing seat of the component, the first plain bearing shell being supported on the projecting first supporting region during the insertion, with the result that the first plain bearing shell is spaced apart from the outer edge of the bearing seat of the component. The use comprises removing of the apparatus after the insertion of the plain bearing shell into the bearing seat of the component.

In particular, the plain bearing shell can slide along on the first supporting region during the insertion.

The first supporting region can preferably project beyond the outer edge of the bearing seat by in a range of less than 2%, in particular by in a range between 0.5% and 2%, of a bearing diameter of the bearing seat. For example, the first supporting region can project beyond the outer edge of the bearing seat by more than 0 mm and/or less than 5 mm. In particular, the first supporting region can project beyond the outer edge of the bearing seat by between approximately 0.5 mm and approximately 2 mm.

In one development, the component has a fastening element seat, in particular a screw hole, for receiving a fastening element, in particular a screw, for fastening a cover, in particular a bearing block cover or a connecting rod cover. The apparatus can then be attached releasably to the component by means of the first attachment region which is attached in the fastening element seat or to the fastening element. In this way, the apparatus can be fastened to elements of the component and the component cover which are present on the component for fastening the component cover in any case.

In a further exemplary embodiment, furthermore, the use comprises attaching the apparatus to a cover, in particular a bearing block cover or a connecting rod cover, for the component by means of the first attachment region, with the result that the first supporting region projects beyond an outer edge of a bearing seat of the cover. The use comprises, furthermore, inserting a second plain bearing shell, in particular a second plain bearing half shell, into the bearing seat of the cover, the second plain bearing shell being supported on the projecting first supporting region, with the result that the second plain bearing shell is spaced apart from the outer edge of the bearing seat of the cover during the insertion. The use comprises, furthermore, removing the apparatus after the insertion of the second plain bearing shell into the bearing seat of the cover, and fastening the cover to the component. In this way, the same apparatus can be used with both the component and the cover for the component. It is also possible, however, that different apparatuses are used for the component and the cover.

In particular, the cover can have a fastening element seat, in particular a screw hole, for receiving a fastening element, in particular a screw, for fastening the cover to the component. In addition, the apparatus can be attached releasably to the cover by means of the first attachment region which is attached in the fastening element seat or to the fastening element.

Figure 2:
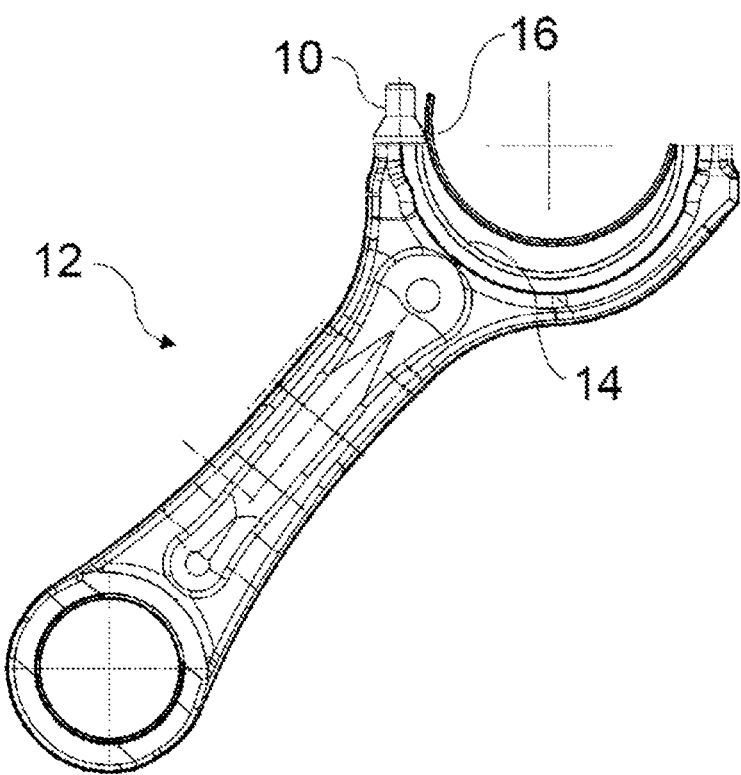
Figure 3:
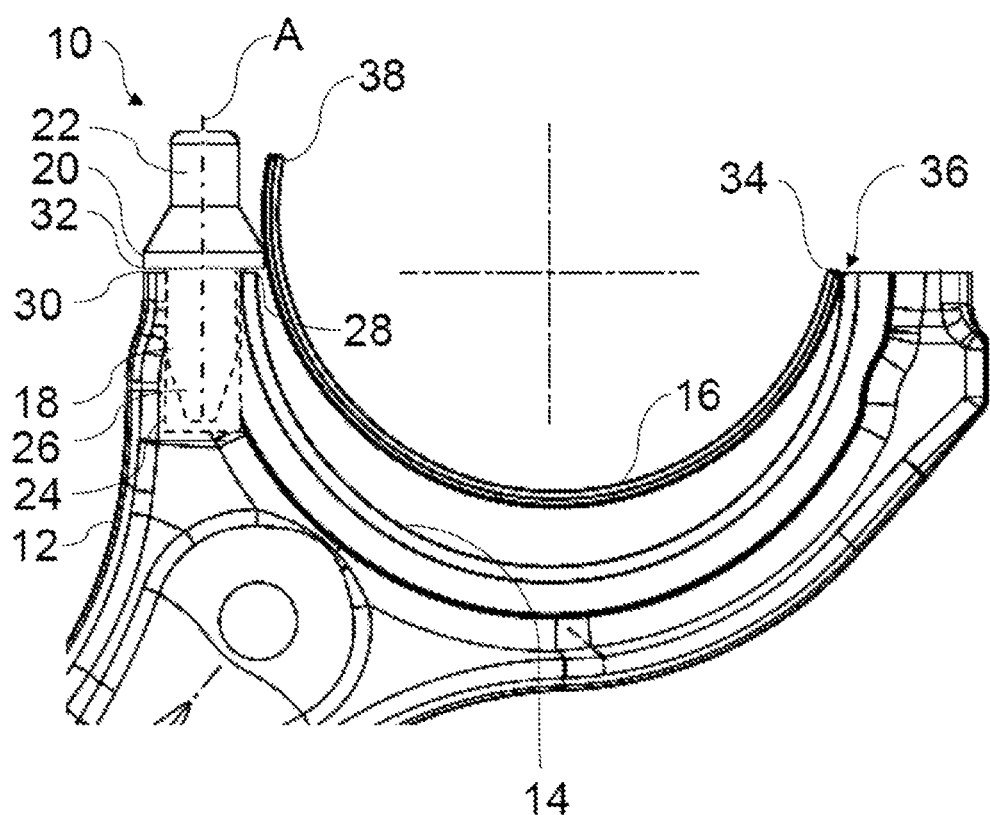
Figure 4:
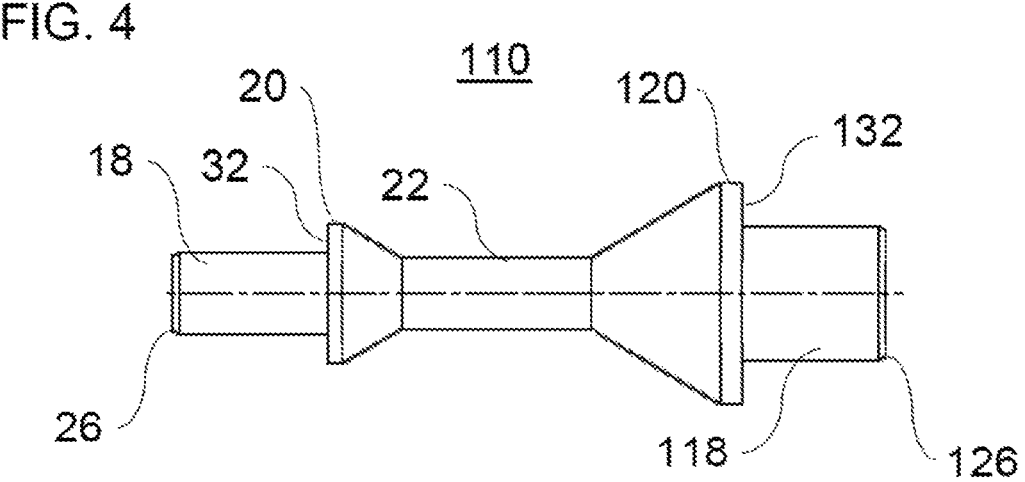
Figure 5:
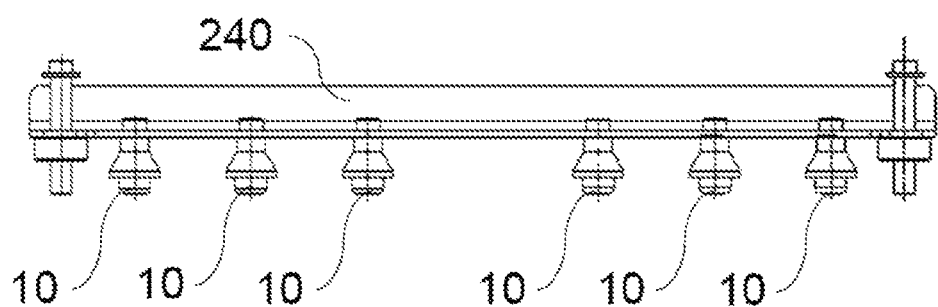
Figure 6:
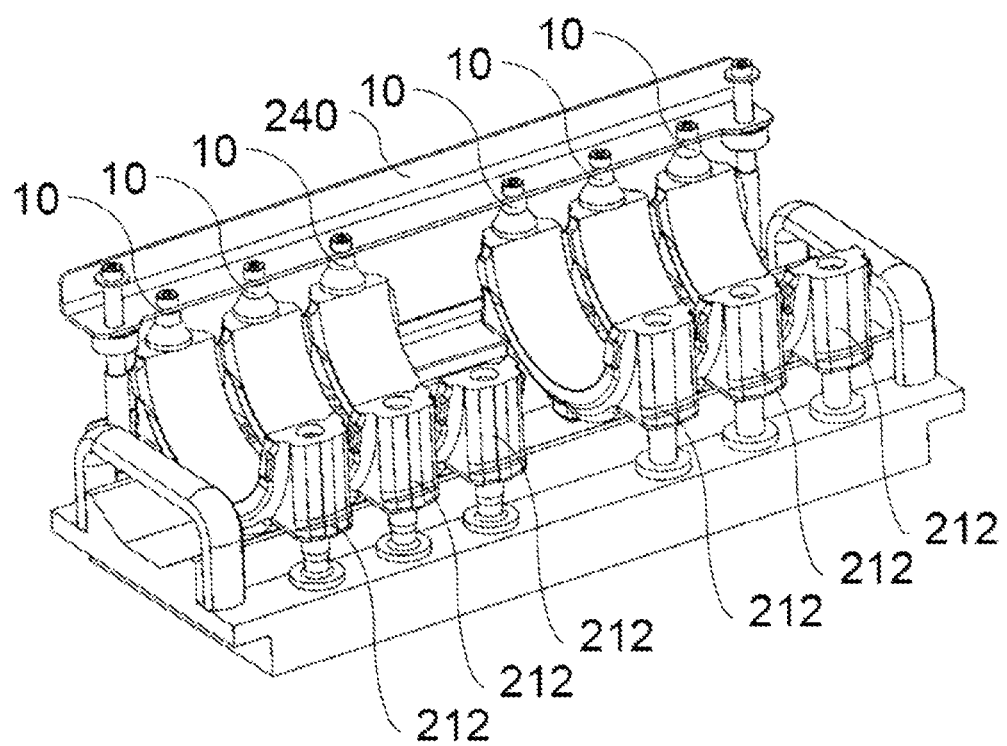
Figure 7:
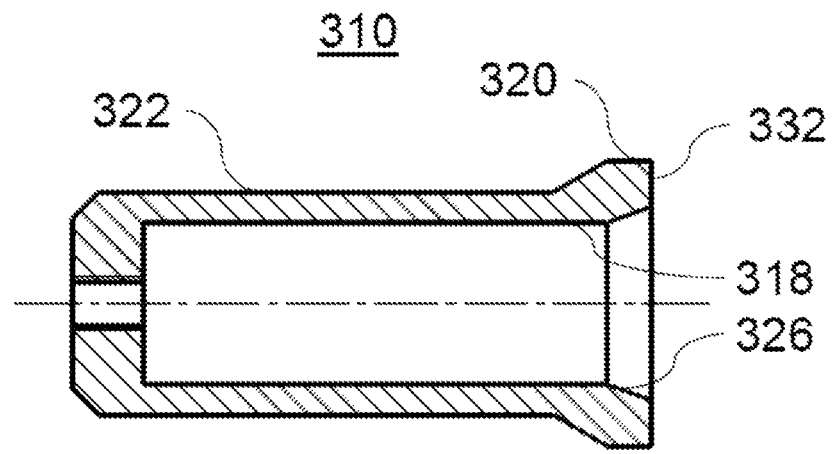
Figure 8:
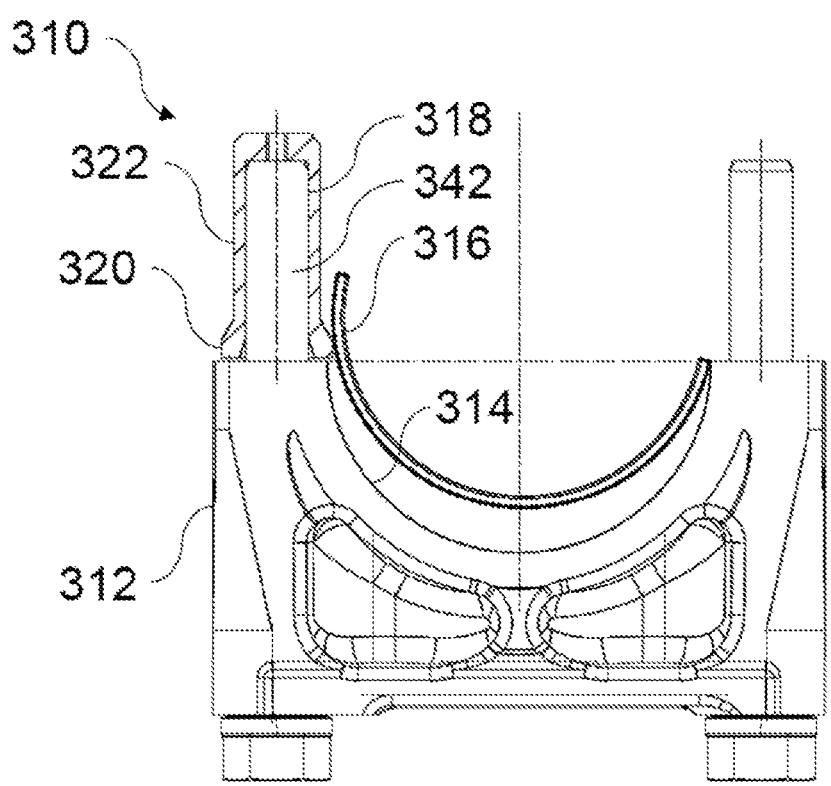

The above-described preferred embodiments and features of the invention can be combined with one another in any desired way. Further details and advantages of the invention will be described in the following text with reference to the appended drawings, in which:

FIG. 1 shows a side view of an insertion aid for plain bearings in accordance with a first embodiment, FIG. 2 shows a side view of a connecting rod part with a plain bearing half shell and the insertion aid in accordance with the first embodiment, FIG. 3 shows a detailed view of the connecting rod part from FIG. 2, FIG. 4 shows a side view of an insertion aid for plain bearings in accordance with a second embodiment, FIG. 5 shows a side view of an insertion aid for plain bearings in accordance with a third embodiment, FIG. 6 shows a perspective view of a bearing block assembly with the insertion aid for plain bearings in accordance with the third embodiment, FIG. 7 shows a longitudinal sectional view through an insertion aid for plain bearings in accordance with a fourth embodiment, and FIG. 8 shows a side view through a connecting rod cover with an insertion aid for plain bearings in accordance with the fourth embodiment, in a partially sectioned view.

The embodiments which are shown in the figures correspond to one another at least in part, with the result that similar or identical parts are provided with the same reference signs and reference is also made to the description of the other embodiments and/or figures in order to describe them, so as to avoid repetitions.

Reference is made first of all to FIGS. 1 to 3. FIG. 1 shows an insertion aid 10 for plain bearings. FIGS. 2 and 3 show the insertion aid 10 mounted on a component 12 with a bearing seat 14, and a plain bearing shell 16 during the insertion into the bearing seat 14. Herein, the insertion aid 10 is also called an apparatus for mounting a plain bearing shell of a plain bearing in a bearing seat of a component. The component 12 can be, for example, a connecting rod part (as shown) or a bearing block part of an internal combustion engine. The internal combustion engine can be housed, for example, in a commercial vehicle, for example an omnibus or a lorry. It is also possible, however, to use the insertion aid 10 in any other machine which has split plain bearings.

The insertion aid 10 is configured as an elongate body. The insertion aid 10 has an attachment region 18, a supporting region 20 and a grip region 22 (see FIG. 1).

The attachment region 18 and the grip region 22 are arranged at free ends of the insertion aid 10. The supporting region 20 is arranged between the attachment region 18 and the grip region 22. The attachment region 18 and the supporting region 20 together form a mushroom shape. The attachment region 18, the supporting region 20 and the grip region 22 are manufactured integrally from one piece. It is also possible, however, to manufacture the insertion aid 10 in multiple pieces. The insertion aid 10, in particular the supporting region 20 of the insertion aid 10, is preferably manufactured from a non-abrasive material, for example a plastic material and/or an elastomer material. For example, the material of the insertion aid 10, in particular the supporting region 20 of the insertion aid 10, can be manufactured from a material which is softer (less hard) than the material of the plain bearing shell 16.

The attachment region 18 is configured to be attached to the component 12 with the bearing seat 14. In the embodiment which is shown, the attachment region 18 is of pin-like configuration. The attachment region 18 can be plugged into a screw hole 24 of the component 12 (see FIG. 3), in order to attach the insertion aid 10 to the component 12. In particular, the pin-like attachment region 18 is adapted to the screw hole 24, with the result that the insertion aid 10 cannot be moved in the screw hole 24 in a perpendicular direction with respect to a centre axis or longitudinal axis A of the insertion aid 10. In other words, an external diameter of the attachment region 18 corresponds substantially to an internal diameter of the screw hole 24. The screw hole 24 can be present in any case in the component 12 for fastening a (bearing) cover, for example a bearing block cover or a connecting rod cover, for the component 12. It is therefore not necessary to adapt the component 12 with respect to the use of the insertion aid 10.

In order to facilitate the introduction of the attachment region 18 into the screw hole 24, the attachment region 18 can have a tapering section 26. The attachment region 18 tapers on the tapering section 26. The tapering section 26 is arranged at a free end of the attachment region 18. The tapering section 26 can be configured as a chamfer.

The supporting region 20 has an annular contact face 32 which adjoins the attachment region 18. By way of the contact face 32, the insertion aid 10 can lie on a contact surface 30 of the component 12 in the attached state. The contact surface 30 can be flat or irregular. For example, the contact surface 30 can be a "cracked" or fracture-split face of a connecting rod.

The supporting region 20 serves to support the plain bearing shell 16 during the insertion of the plain bearing shell 16 into the bearing seat 14 of the component 12. In the embodiment which is shown, the supporting region 20 extends radially to the outside from the centre axis A. In the mounted state of the insertion aid 10, a radial outer section of the supporting region 20 projects beyond a sharp-edged, substantially rectilinear outer edge 28 of the bearing seat 14. The outer edge 28 delimits the bearing seat 14 and the contact surface 30 of the component 12.

The projection of the supporting region 20 beyond the outer edge 28 brings it about that the plain bearing shell 16 does not come into contact with the outer edge 28 during the insertion into the bearing seat 14. In detail, the plain bearing shell 16 has what is known as a spread before the mounting, with the result that a spacing of the free ends of the plain bearing shell 16 is greater than an internal diameter of the bearing seat 14. During the insertion into the bearing seat 14, the free ends of the plain bearing shell 16 are deformed elastically with respect to one another. In particular, a first free end 34 of the plain bearing shell 16 is set against an outer edge 36 of the bearing seat 14, which outer edge 36 lies opposite the outer edge 28. The plain bearing shell 16 is pivoted into the bearing seat 14. A second end 38 of the plain bearing shell 16 comes into contact with the supporting region 20. The second end 38 is guided along the (soft) supporting region 20 and does not come into contact with the outer edge 28. As a result, no score marks and no swarf abrasion occur on the plain bearing shell 16 during the insertion. The material pairing comprising metal of the plain bearing shell 16 and plastic/elastomer of the insertion aid 10 slides on one another satisfactorily. The mounting force is reduced. Finally, the second end 38 of the plain bearing shell 16 passes the supporting region 20, and the plain bearing shell 16 snaps into the bearing seat 14.

It is also possible, for example, to use two insertion aids 10 on both sides of the bearing seat 14. The plain bearing shell 16 can then be pushed into the bearing seat 16 between the respective supporting regions 20 of the two insertion aids 10.

The supporting region 20 can project beyond the outer edge 28 by in a range of greater than or equal to approximately 0.5 mm. In particular, the supporting region 20 can be dimensioned in such a way that it projects beyond the outer edge 28 by between approximately 0.5 mm and approximately 2 mm. In this way, an abrasion of the plain bearing shell 16 on the outer edge 28 can be prevented effectively.

The insertion aid 10 can also be used in an analogous way for mounting a plain bearing shell in the cover for the component 12. The cover can then be mounted with a mounted plain bearing shell on the component 12 with a mounted plain bearing shell 16, in particular by means of a screw which engages into the screw hole 24.

The supporting region 20 is of rotationally symmetrical configuration about the centre axis A. As a result, the insertion aid 10 can be inserted into the screw hole 24 at any rotary angle about the centre axis A. The projection of the supporting region 20 beyond the outer edge 28 remains identical.

The insertion aid 10 can be gripped and moved manually by means of the grip region 22. In this way, the insertion aid 10 can be guided to the component 12 and removed from the component 12 in a simple way. The grip region 22 can be configured integrally with the projection region 20.

FIG. 4 shows a second exemplary embodiment for the insertion aid. The insertion aid 110 of FIG. 4 has the attachment region 18, the supporting region 20 and the grip region 22, just like the insertion aid 10 of FIGS. 1 to 3.

In addition, the insertion aid 110 has a second attachment region 118 and a second attachment region 120. The attachment regions 18, 118 are arranged at opposite ends of the insertion aid 110. The supporting regions 20, 120 are arranged between the attachment regions 18, 118.

As a result of the two attachment regions 18, 118 and the two supporting regions 20, 120, the insertion aid 110 can serve as an insertion aid for plain bearing shells of two different components. For example, the attachment region 18 can be adapted to the screw hole 24 of the connecting rod part of FIGS. 2 and 3. The attachment region 118 can be adapted to another screw hole, for example, of a main bearing block of a crankshaft bearing. In this way, the insertion aid 110 can be used in two ways.

It is possible in principle to provide an insertion aid which can be used in n ways, with n different attachment regions and/or supporting regions, it being possible for n to be an integral natural number.

The second attachment region 118 can have, for example, a tapering section 126 which is configured as a chamfer. The second supporting region 120 can have an annular contact face 132 in a similar manner to the contact face 32 of the first supporting region 20.

FIGS. 4 and 5 show a third exemplary embodiment for the insertion aid. The insertion aid 210 of FIG. 4 and FIG. 5 has a plurality of the insertion aids 10 and an elongate body 240.

In detail, the insertion aids 10 are fastened to the elongate body 240 such that they are spaced apart from one another along the elongate body 240, for example a bar. The insertion aid 210 is configured in such a way that the attachment regions 18 of the insertion aids 10 can be attached to components 212, for example bearing block parts, which are arranged next to one another. In this way, the insertion aid 210 has to be mounted only once, in order to then insert a plurality of plain bearing shells into the components 212.

For example, the insertion aid 210 can combine between two and six insertion aids 10 with one another. It is also possible that, for example, a plurality of insertion aids 110 (see FIG. 4) are combined with one another.

In addition to the attachment regions of the insertion aids 10, the insertion aid 210 can have further attachment regions which are arranged, for example, at opposite ends of the insertion aid 210.

FIGS. 7 and 8 show a fourth exemplary embodiment for the insertion aid. The insertion aid 310 of FIG. 7 and FIG. 8 has an attachment region 318, a supporting region 320 and a grip region 322.

The supporting region 320 and the grip region 322 surround the attachment region 318. The supporting region 320 and the grip region 322 can be of similar configuration, for example, with respect to the supporting region 20 and the grip region 22 (see FIGS. 1 to 3) as disclosed herein.

The attachment region 318 is configured as a seat, in particular a blind bore. Via the attachment region 318, the insertion aid 310 can be plugged, for example, onto a screw shank of a screw 342 which has already been pre-mounted. For example, the screw 342 for connecting the component 312 which is configured as a connecting rod cover to the component 12 which is configured as a connecting rod (see FIGS. 2 and 3) can already be pre-mounted on the component 312 before the plain bearing shell 316 is inserted into the bearing seat 314 of the component 312. In order to facilitate plugging onto the screw 342, the attachment region 318 can have a tapering region 336 which widens towards an opening of the attachment region 318. The insertion aid 310 can lie on the component 312 by means of a contact face 332.

The invention is not restricted to the above-described preferred exemplary embodiments. Rather, a multiplicity of variants and modifications is possible which likewise utilize the concept of the invention and therefore fall within the scope of protection. In particular, the invention also claims protection for the subject matter and the features of the subclaims independently of the claims, to which they refer. In particular, the features of independent claim 1 are disclosed independently of one another. In addition, the features of the subclaims are also disclosed independently of all the features of independent claim 1 and, for example, independently of the features with regard to the presence and/or the configuration of the attachment region and the supporting region of independent claim 1.

LIST OF REFERENCE SIGNS

A Centre axis
10 Insertion aid (apparatus for mounting a plain bearing shell)
12 Component
14 Bearing seat
16 Plain bearing shell
18 (First) attachment region
20 (First) supporting region
22 Grip region
24 Screw hole
26 Tapering section
28 Outer edge
30 Contact surface
32 Contact face
34 First end
36 Outer edge
38 Second end
110 Insertion aid
118 Second attachment region
120 Second supporting region
126 Tapering section
132 Second contact face
210 Insertion aid
212 Component
240 Elongate body
310 Insertion aid
312 Component
314 Bearing seat
318 Attachment region
320 Supporting region
322 Grip region
332 Contact face
342 Screw

What is claimed is:

1. A method, comprising:
using an apparatus during the insertion of a plain bearing shell into a bearing seat of a component, the apparatus including a first attachment region for releasably attaching the apparatus to the component, and the apparatus further comprising a first supporting region for supporting the plain bearing shell during an insertion of the plain bearing shell into the bearing seat of the component, and the apparatus further comprising a grip region for gripping and guiding the apparatus, the grip region being configured to adjoin the first supporting region, so as to lie opposite the first attachment region.

2. The method according to claim 1, further comprising:
attaching the apparatus to the component by means of the first attachment region such that the first supporting region projects beyond an outer edge of the bearing seat;
inserting a first plain bearing shell comprising a first plain bearing half shell into the bearing seat of the component, the first plain bearing shell being supported on the projecting first supporting region during the insertion, such that the first plain bearing shell is spaced apart from the outer edge of the bearing seat of the component; and
removing the apparatus after the insertion of the plain bearing shell into the bearing seat of the component.

3. The method according to claim 2, wherein:
the component has a fastening element seat comprising a screw hole for receiving a fastening element comprising a screw for fastening a cover, the cover comprising a bearing block cover or a connecting rod cover; and
the apparatus is attached releasably to the component by means of the first attachment region which is attached in the fastening element seat or to the fastening element.

4. The method according to claim 2, further comprising:
attaching the apparatus to a cover for the component, the cover comprising a bearing block cover or a connecting rod cover, by means of the first attachment region, such that the first supporting region projects beyond an outer edge of a bearing seat of the cover;
inserting a second plain bearing shell including a second plain bearing half shell into the bearing seat of the cover, the second plain bearing shell being supported on the projecting first supporting region, such that the second plain bearing shell is spaced apart from the outer edge of the bearing seat of the cover during the insertion; and
removing the apparatus after the insertion of the second plain bearing shell into the bearing seat of the cover; and
fastening the cover to the component.

* * * * *